C. Disston,

Saw Teeth,

No. 3,052, Reissued July 28, 1868.

Witnesses;
Wm. Albert Seal
W. Mabbitany

Inventor;
Chas. Disston
By his Atty
H. Howson

N. PETERS, PHOTO-LITHOGRAPHER, WASHINGTON, D. C.

United States Patent Office.

HENRY DISSTON, OF PHILADELPHIA, PENNSYLVANIA, ASSIGNEE OF CHARLES DISSTON, OF SAME PLACE.

*Letters Patent No.* 63,486, *dated April* 2, 1867; *reissue No.* 3,052, *dated July* 28, 1868.

IMPROVEMENT IN SAWS.

The Schedule referred to in these Letters Patent and making part of the same.

TO ALL WHOM IT MAY CONCERN:

Be it known that I, HENRY DISSTON, of Philadelphia, Pennsylvania, am the owner of certain Letters Patent for an Improvement in Saws, granted to Charles Disston, April 2, 1867; and I do hereby declare the following to be a full, clear, and exact description of the same.

The invention of the said Charles Disston relates to improvements in detachable saw-teeth, having circular bases to fit in corresponding recesses in the blade, and the invention consists of a projection on the rear of the tooth, in combination with a shoulder on the blade, against which shoulder the said projection may be brought to bear, by partly turning the tooth, all as described hereafter, so that the shoulder may act as an effective bar to prevent the further turning of the tooth, and to resist the end strain imparted to it, as well as to give lateral rigidity to the tooth when the saw is in action.

The invention further consists of the mode described hereafter, of so securing the tooth as to prevent its being turned forward from the above-mentioned shoulder.

In order to enable others skilled in the art to make and use the invention, I will now proceed to describe the manner of carrying it into effect, reference being had to the accompanying drawing, which forms a part of this specification, and in which—

Figure 1:
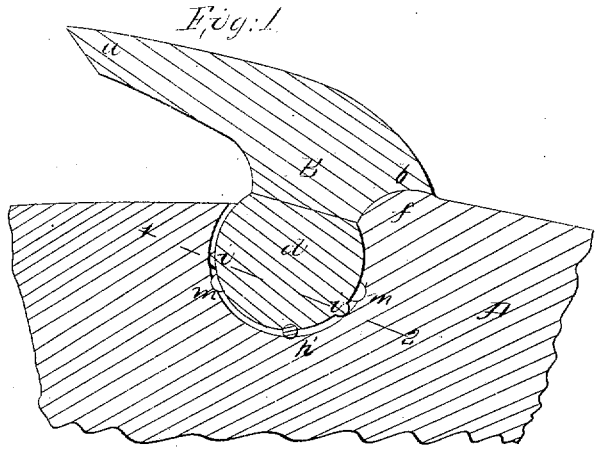

Figure 1 is a sectional view of part of a saw with a detachable tooth.

Figure 2:
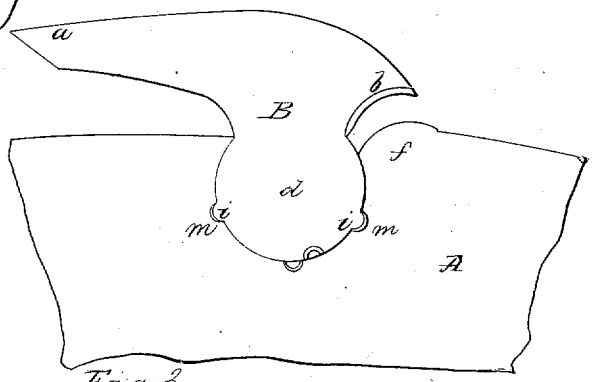

Figure 2, an exterior view, illustrating the mode of applying the tooth.

Figure 3:
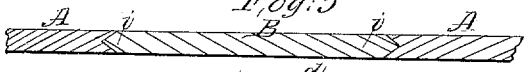

Figure 3, a transverse section on the line 1–2, fig. 1, drawn to an enlarged scale.

Figure 4:
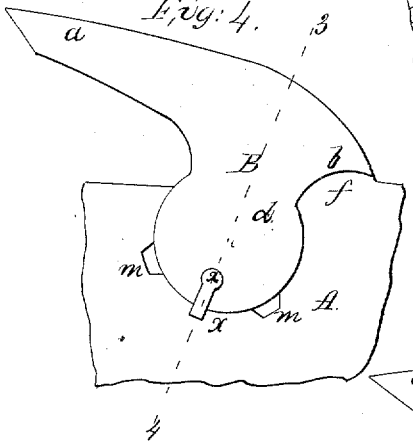

Figure 4, a modification, and

Figure 5:
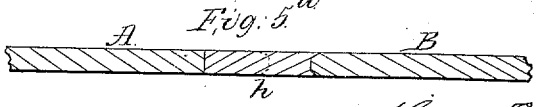

Figure 5 a transverse section of the line 3–4, fig. 4, drawn to an enlarged scale.

Similar letters refer to similar parts throughout the several views.

A represents a portion of the blade of a circular or other saw, to which the teeth have to be secured, and B is one of the teeth, which consists of a cutting projection, *a*, the curved projection *b*, and the circular projection or base *d*.

In the edge of this base is a recess, *x*, which is enlarged at the inner end, as shown in fig. 4, this enlarged portion being countersunk on both sides, for a purpose described hereafter.

The blade of the saw is placed on the bed of an ordinary drilling-machine, and holes, corresponding in number and position to the teeth required, are drilled in the blade, so near the edge that the drill shall project beyond the latter, the edge of the hole being thus the segment of a circle. By a suitable tool in the same drilling-machine, a groove is formed in the edge of each hole to receive the V-shaped lips *i i*, on the edge of the circular base *d* of the tooth, this base being of exactly the same diameter as the hole in the blade of the saw, measured on the outer surface of the same.

In the edge of each hole are cut recesses, *x'* and *m*, there being as many of the latter as there are lips on the base, *d*, so that when the tooth is in the position shown in fig. 2, it may be fitted laterally to the hole, the lips passing into the said recesses *m*.

After the circular base *d* of the tooth has been thus placed in the hole, the tooth is drawn back to the position shown in fig. 1, so that its curved projection *b* may be brought to bear against the rounded portion *f* of the blade, the recess *x* being brought opposite the recess *x'*, and the V-shaped lips *i* taking their places in the V-shaped grooves in the edge of the hole in the blade, to which the tooth is now confined.

Additional lateral security is afforded by making the under side of the curved projection *b*, V-shaped, to correspond with a V-shaped groove in the shoulder *f* of the blade. After the tooth has been thus fitted and confined to the blade, a metal block or rivet, *h*, which will fit accurately in the two openings *x x'*, is inserted in the latter, and the portion fitting the enlarged end of the opening *x* is riveted on both sides, so that the block is confined firmly in its place, and the tooth is prevented from turning, without the necessity of inserting a rivet in the saw-blade.

In place of the block or rivet *h*, a small hole may be drilled, partly in the edge of the tooth and partly in the edge of the hole in the blade, this hole being countersunk on both sides, so that a rivet, *h'*, may be fitted in it without projecting above the surface of the saw. The tooth is now perfectly secure, but can be removed readily after withdrawing the rivet and forcing the tooth forward to the position shown in fig. 2.

This rivet has no duty to perform, as regards resisting the end strain imparted to the tooth as it acts on the wood, this resistance being effected by the shoulder *f*, on the blade against which the projection *b* is turned down on introducing the tooth to its place. It is this bearing of the projection against the shoulder which effectually prevents any tendency which the base, *d*, of the tooth might otherwise have to turn, and which forms the most important feature of the invention.

I wish it to be understood that I do not desire to claim broadly, as the invention of the said Charles Disston, a saw-tooth having its base formed on a circular line, and fitting a recess in the saw-blade; nor do I desire to claim broadly, as his invention, a detachable saw-tooth having at the back a projection for bearing against a shoulder on the blade; but

I claim as his invention, and desire to secure by Letters Patent—

1. A detachable saw-tooth, in which is combined a circular base adapted to a circular recess in the blade with a projection at the rear adapted to a shoulder on the blade, all as set forth for the purpose specified.

2. The lips *i* on the edge of the projection *d* of a saw-tooth, or on the edge of a recess in the blade, in combination with a groove and recesses *m*, in the projection or in the blade, substantially as specified.

In testimony whereof, I have signed my name to this specification before two subscribing witnesses.

HENRY DISSTON.

Witnesses:
H. Howson,
C. B. Price.